Patented Nov. 5, 1935

2,019,489

UNITED STATES PATENT OFFICE 2,019,489

SPONGE RUBBER AND METHOD OF MANUFACTURING THE SAME

Charles F. Flemming, Cicero, Ill., assignor to Roth Rubber Company, Cicero, Ill., a corporation of Illinois No Drawing. Application November 2, 1932, Serial No. 640,777

5 Claims. (Cl. 18—53)

My invention relates to sponge or expanded rubber and has to do more particularly with methods of manufacture of the same.

One of the features of my invention is a new method of manufacture for producing articles of sponge or expanded rubber in a simpler and cheaper manner.

To this end I have provided an improved method in which I employ what I term a yielding support or liquid mold, that is, in which the sponge rubber, instead of being treated for curing or vulcanization in hard molds as have heretofore been used, is submerged in, floated upon, or exposed to, a heated liquid. Thus, for example, in making sponge rubber cord or a rod it is passed through a hot liquid bath of proper temperature and for a sufficient period of time to effect the proper blowing and vulcanization thereof. Or, where single articles are made of sponge rubber the pre-formed pieces are submerged in or floated upon the liquid as a yielding support, or exposed to the heated liquid to the same end.

In the process now generally employed in the manufacture of sponge rubber cord, the pre-formed cord after being passed through the tuber or extruding head is reeled upon pans and then taken to the vicinity of the curing process where the cord is placed into a spiral two-piece mold which is used for curing or vulcanizing the product. In this practice the pre-formed plastic stock is carefully laid into one-half of the mold, after which the other half is placed thereon, the mold fastened together and placed in the ordinary vulcanizing press. In this method of manufacture the length of cord is of course limited as this is determined by the size of mold that may be handled. Also in this process the output is limited by the number of molds employed which are expensive, the size of the mold is limited to the size of press available, and in this present process of manufacture, ordinarily only a single cord is extruded from the tuber and then reeled out on a pan. The cord stock as it is extruded from the tuber is very difficult to handle and this is one of the reasons that but a single cord may be extruded from the press and passed out upon the reel pan before it is taken to the dies.

Under my improved process these objections are overcome and the cord may be formed straight and in a continuous length, depending only upon the quantity desired or the amount of the finished product which may be conveniently placed upon a single reel. Also by my continuous method of manufacture the finished cord may be passed forthwith through a proper knitting machine when it is desired to cover the exterior by knitted or web fabric.

Referring now more in detail to the manufacture of sponge cord under my improved process, I take, for example, 100 parts of crude rubber which is broken down or sufficiently plasticized in the ordinary manner, such as by the ordinary rubber mill, and to which I add a suitable blowing agent, such as bi-carbonate of soda, ammonium carbonate, softeners such as suitable fatty acids, oils or petrolatums, oil pigments, sulphur, etc., to produce the proper stock, depending upon the desired final product. As an illustration of a suitable compound I would add to the 100 parts rubber, 12 parts acid sodium carbonate, 4 parts oleic acid, 10 parts stearic acid, 6 parts zinc carbonate, 10 parts lithopone, and 3 parts sulphur.

To the above may be added a suitable accelerator such as zinc butyl xanthogenate or other well known product. Sponge rubber stock, because of its usual excessive plasticity may not be readily vulcanized in open steam vulcanizers or curing ovens and retain its original pre-formed shape of the uncured stock without being cured under support, because, if cured without a support the plastic stock will flatten out as it becomes further plasticized during the preliminary heat of vulcanization, thus distorting its original shape as it expands before it has been sufficiently cured or set up by the vulcanization. Therefore in my process it is desirable to speed up the vulcanization or setting of the stock, so I preferably add 3 parts of accelerator such as zinc butyl xanthogenate to secure a quicker set up of the outer surface of the product, thereby aiding in maintaining the original shape of the pre-formed stock during the blowing and vulcanizing process. When the accelerator is used this preferably is not added to the stock until shortly before using or pre-forming the same as a precaution against any setting or partial pre-vulcanization of the stock before it is ready to use.

It is to be understood, however, that the above is given as an example of producing a product to be treated by my improved method, and any suitable gas producing or gas liberating agent may be employed as the blowing element, and any desirable plasticizer, activator, coloring element, and accelerator may be employed.

It is also to be understood that the mixture may be varied depending upon the final product wanted as the degree of blowing or expansion is controlled to a great extent by the plasticity of the stock, the amount of fatty acids, etc. present in the stock, as well as the particular blowing agent or amount thereof employed.

Having mixed the above ingredients sufficiently in the usual way, and assuming that sponge rubber cord is to be made, the stock is fed through an ordinary rubber tubing machine or extruding mill, and passed through a die of a diameter which will produce the desired diameter of cord after it has expanded during treatment by my improved process.

This cord stock is now preferably passed directly from the extruding press into the so-called liquid mold, that is, into a pan of heated liquid, the temperature of which and the period of time to which the cord is exposed therein being determined by the raw material being acted upon. For this purpose I find I may employ water brought up to a boiling point, the extruded cord passing along through the boiling water for a sufficient period of time to effect the desired amount of blowing and vulcanization thereof. Ordinarily the above stock having an ultimate diameter of three-eighths of an inch will cure in about two and one-half to three minutes.

The water pan is preferably arranged slightly below the tuber head so that the cord passes directly into the heated liquid. The cord is submerged in the water so that the latter acts as a carrier or liquid mold entirely surrounding and supporting the stock which is at once affected by the heat, causing a liberation of gas from the gas forming substances therein, expanding the stock so that it becomes buoyant and tends to rise to the surface. In order to keep the cord from rising above the surface of the water, any suitable means may be employed therefor, such as a conveying belt placed slightly below the surface of the water and moving along at the same speed at which the cord moves through the water, thereby maintaining the cord submerged and carrying it along toward the outlet of the tank. Thus, as the cord is moved through the water, the heat causes it to expand and vulcanize, the water acting as a flexible or expanding liquid mold or yielding support for the cord, supporting it from below or from every direction, thereby maintaining the original shape of the cord, whether it be round, square, hexagonal, or any other shape. Thus the stock does not flatten out as it would if placed on a hard support but retains substantially its original pre-formed contour, except that it has expanded.

As the stock is drawn from the water it may be dried in a suitable manner, such as passing through wringing rolls and then reeled or otherwise acted upon as desired.

I may also employ a series of tanks through which the cord is successively passed so the blowing and vulcanization may be controlled by step-up temperatures, as for instance, 100° in the first tank, 200° in the second, 300° in the third, etc.

It is to be understood that other liquids than water and other temperatures than the boiling point of water may be employed. For instance, if higher temperatures than 212° F. are desired, a suitable liquid may be substituted for the water, such as, for example, glycerine which has a higher boiling point. Also lower temperatures may be employed. The liquid and temperature to be employed may vary according to the gravity of the stock and the temperature which the stock will preferably respond to, as well as the period of time to which it is to be exposed. And if high temperature liquid is employed the ultra accelerator may be left out if desired.

It is also to be understood that although I have described my process above as being employed in the manufacture of sponge cord, it may also be employed for the curing of solid rubber cord and other solid articles.

As stated above, my improved process is also applicable to the manufacture of other rubber articles, such as sponge rubber dolls, sponge balls, etc. Heretofore in the manufacture of such articles difficulty has been experienced in maintaining a desirable contour of the article, due to the fact that the article is first pre-formed and then placed in a mold for vulcanization and expanding thereof. In expanding to fill the mold, the stock pockets or traps air in features of the articles, such as at the nose and high points in the mold, thereby causing imperfections in shape of the finished article. In the manufacture of sponge balls, this is usually taken care of by a vent hole in the top and bottom of the mold to allow the air to escape, but in doll molds and molds for similar articles it has been found impractical to place vent holes at many of the points at which the air is trapped.

In my process of manufacturing such articles the stock is first formed into the desired shape by cold molds. The pre-shaped, uncured stock is then removed from the mold and submerged in the hot liquid and subjected to vulcanization and expansion in the same way as the cord is treated. The accelerator or ultra-accelerator when used aids in the retention of the original shape of the article due to the fact that the set up or cure commences very rapidly upon the outer surface and gradually works inwardly. Of course, in the manufacture of such articles the stock may be varied and the cure varied according to the desired ultimate product.

In the manufacture of such articles, considerable saving of molds is brought about as it is unnecessary to have a large stock of molds on hand in which the articles are vulcanized. Also there are the many other savings as in the manufacture of the cord stock, such as vulcanizing presses, etc.

It is to be understood that one of the features of my invention is the use of hot liquid which thus acts as a yielding support for the rubber compound during blowing and vulcanization thereof and that the degree to which the compound submerges is determined by its buoyancy and this of course varies with the ingredients employed and ultimate product desired. Thus when I speak of submerging the rubber compound in liquid it is to be understood that I mean either complete or partial immersion. I have found that although it is preferable to submerge the compound entirely in the liquid bath, very satisfactory results are secured where, although the rubber compound initially submerges entirely and the blowing and initial stage of vulcanization is there effected, the rubber becomes buoyant, floats to the surface, and remains but partially submerged but is still sufficiently yieldingly supported to maintain its shape. Thus the hot liquid acts as a yielding support for the rubber compound whereby it retains its desired shape and does not flatten or distort.

Although I have given several preferred forms of practicing my process and producing the products, it will be understood that many changes and modifications will readily occur to those skilled in the art, and therefore I do not desire to be limited to the exact methods given and products mentioned, but aim to cover all that which comes within the spirit and scope of the appended claims.

What I claim as new and desire to protect by Letters Patent of the United States is:

1. A method of manufacturing sponge rubber which comprises mixing rubber, a blowing agent and a vulcanizing agent including an accelerator, shaping said compound without curing, submerging said shaped mass in a heated liquid bath at a temperature and for a time sufficient to quickly vulcanize the surface, and then to blow and complete the vulcanization thereof, thereby retaining the shape of the uncured mass throughout the blowing and vulcanizing operation.

2. A method of manufacturing sponge rubber which comprises mixing rubber, a blowing agent and a vulcanizing agent including an accelerator, shaping said compound without curing, submerging said shaped mass in a heated liquid bath at a temperature and for a time sufficient to quickly vulcanize the surface and then to blow and complete the vulcanization thereof, the ingredients of the mix being of such proportions that the shape of the uncured mass will be retained throughout the blowing and vulcanizing operations.

3. A method of manufacturing sponge rubber which comprises mixing rubber, a blowing agent and a vulcanizing agent including an accelerator, extruding said compound without curing, submerging said extruded mass in a heated liquid bath at a temperature and for a time sufficient to quickly vulcanize the surface and then to blow and complete the vulcanization thereof, the ingredients of the mix being in such proportions that the shape of the uncured mass will be retained throughout the blowing and vulcanizing operations.

4. A method of manufacturing sponge rubber which comprises mixing rubber, a blowing agent and a vulcanizing agent including an accelerator, shaping said compound without curing, submerging said shaped mass in a single heated liquid bath at a temperature and for a time sufficient to quickly vulcanize the surface and then in a continuous operation from the introduction of the mass to the bath to blow and complete the vulcanization thereof, the ingredients of the mix being in such proportions that the shape of the uncured mass will be retained throughout the blowing and vulcanizing operations.

5. A sponge rubber article characterized by uniform expansion from an uncured shaped mass produced by the process of claim 1.

CHARLES F. FLEMMING.